April 16, 1957 R. J. BLOCK 2,789,232
RADIATION DOSIMETER
Filed Dec. 8, 1953
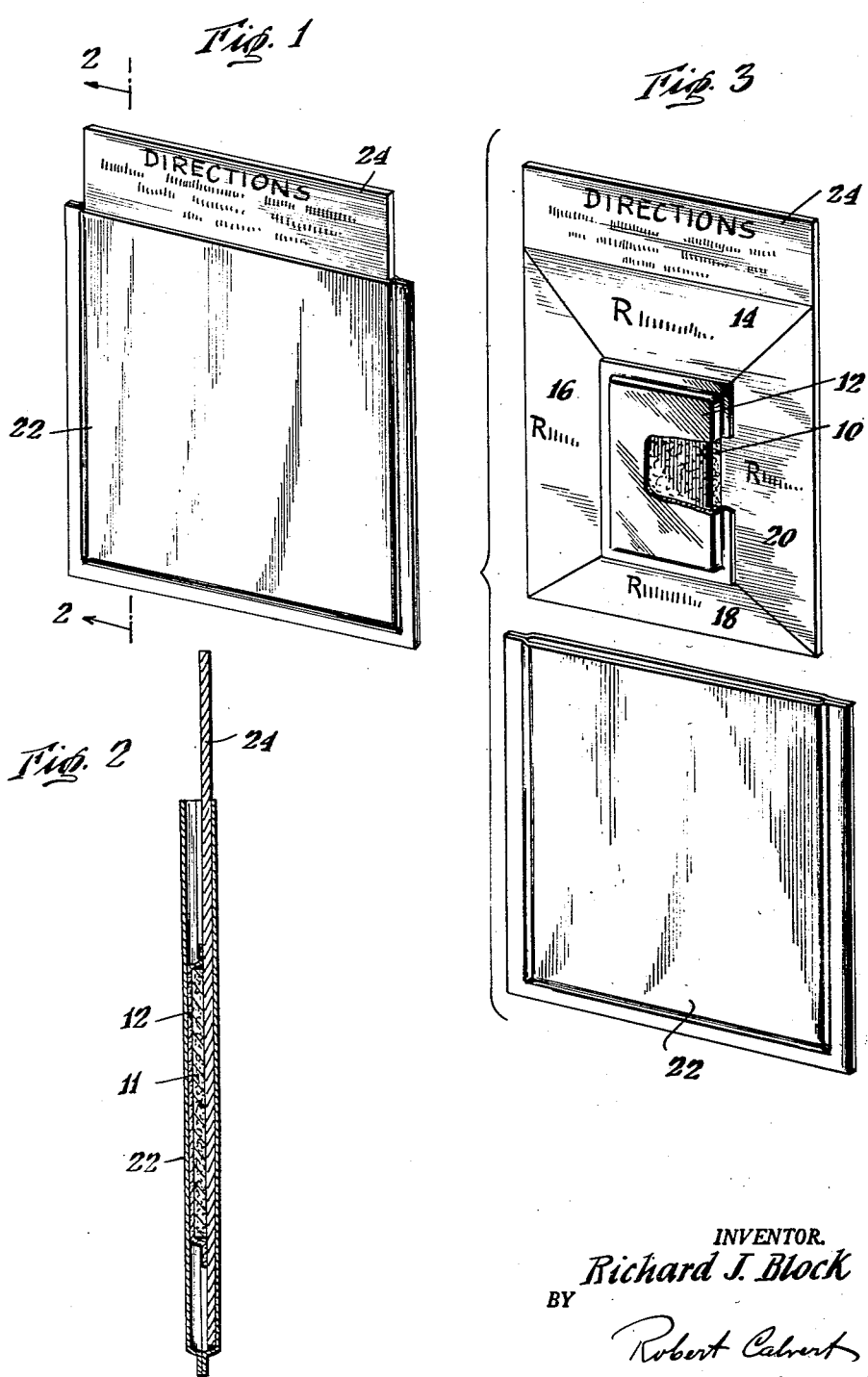
INVENTOR.
Richard J. Block
BY
Robert Calvert
ATTORNEY

United States Patent Office 2,789,232
Patented Apr. 16, 1957

2,789,232

RADIATION DOSIMETER

Richard J. Block, Scarsdale, N. Y.

Application December 8, 1953, Serial No. 396,944

4 Claims. (Cl. 250—83)

This invention relates to a radiation dosimeter.

The invention is particularly useful in connection with measurement of the extent of exposure to gamma radiation from atomic fission and will therefore be illustrated by description in connection with such use.

Those who are informed in matters of military or civilian defense appreciate that casualties from an atomic energy attack will be classified for treatment, if possible, according to the extent of exposure to which they have been subjected. Thus there will be casualties so severely exposed that recovery under any circumstance is not to be expected and others exposed less severely for whom proper therapy is imperative.

It is not surprising, therefore, that there have been numerous proposals of means for determining the classification of casualties as to the severity of exposure. There have been proposed, for instance, the use of a mixture of chloroform and alcohol. This fluid mixture, on exposure to gamma rays, develops acidity, the concentration of which may be indicated roughly at least by certain pH indicators. Films sensitive to exposure to gamma radiations are worn by employees in atomic energy plants, as in their identification badge; development of the film is required to show the extent of radiation to which the film has been exposed. Also, silver impregnated phosphate glass has been proposed as a dosimeter for gamma radiation; such glass requires a source of ultraviolet light for observance of the effect.

These proposals require either the use of a liquid composition or special means for developing or observing the effect of the exposure.

My invention provides a non-liquid sheet that requires no subsequent development or special light for observation.

Briefly stated, my invention comprises a radiation dosimeter including moisture in non-liquid form and a hydrogen-peroxide-colorable composition associated with the non-liquid moisture. The peroxide-colorable nature of the composition shows that it is colorable also by gamma rays, since these rays are considered to function with my composition by first reacting with water present, to give hydrogen peroxide.

To obtain the effect of moisture in this article without introducing a liquid phase requiring a tube or container suitable for liquid water, I use a moisture adsorbent material and limit the amount of moisture introduced into this material to a proportion that is adequate to give the necessary color effects on exposure to gamma rays but not enough to give any liquid phase in the article.

The invention will be further illustrated by description in connection with the attached drawings to which reference is made.

Fig. 1 is a perspective view of my dosimeter with parts broken away for clearness of illustration.

Fig. 2 is a sectional view on line 2—2 of Fig. 1.

Fig. 3 is a perspective view of the article of the invention with parts broken away for clearness of illustration and disassembled, to show in full the outer metal sheath and the filler therefor.

There are shown the radiation sensitive member in the form of a sheet of moisture adsorbent material 10 or granule or powder 11 containing hydrogen-peroxide-oxidizable chemical (not shown) and an oxygen and moisture proof container 12 which completely seals the article against entrance of air or passage of moisture between the outside air and the elements 10 or 11. The container is a transparent envelope, a form of which is shown and constituted by element 12 sealed around its edges to the backing or mounting member 24. A color chart appears at 14, 16, 18, and 20, for comparing the color that appears on exposure to colors known to develop at levels within the critical range of radiation exposures.

A ray filter member 22 serving as a sheath for the sensitive member 10, to decrease the incidence of radiation thereon, may be used if desired. An oxygen and moisture proof mounting sheet 24 extending on the side of the member 10 opposite the sealing material 12 is sealed to this element 12, so as to complete the insulation of part 10 from loss of moisture to the air or access of oxygen or moisture from the air. The sealing of 24 to 12 around the edges of member 10 is by conventional means such as heat welding or adhesive (not shown).

Impregnated into the sheet of fibrous material is a hydrogen-peroxide-colorable compound (not shown) and also moisture in amount required for the production of hydrogen peroxide from water under the influence of gamma rays. The amount of water, however, is less than that which, if used, would give a liquid phase.

In the modification of Fig. 2, the adsorbent material is in powdered or granular form. Other parts and features are as described above. Examples of granular and powdered adsorbents that may be used are silica gel, hydrated calcium silicate, and adsorbent aluminum oxide. These as used may be formed into the unit 11 including a conventional adhesive (not shown).

As to materials, the sheet 10 is composed of moisture adsorbent material that is chemically inert under the conditions of use. Examples of material that may be used are felted or woven sheets of wood pulp fibers, cotton, rayon, or surgical wool. Commercial products that are satisfactory are filter paper, blotting paper, and cotton cloth.

The hydrogen-peroxide-colorable composition may be one of the following:

(1) A ferrous salt, such as the sulfate, chloride, or acetate, mixed with an indicator which, by change in color, shows the existence of ferric iron. Thus, there may be used with the ferrous salt either potassium ferrocyanide, potassium thiocyanate, or ammonium thioglycolate. The well known blue color with ferric iron given by the ferrocyanide and the red to pink color with the other indicators depend for their intensity upon the concentration of the ferric iron present. This, in turn, depends upon the amount of hydrogen peroxide or other oxidizing effect developed by the gamma rays;

(2) A ceric salt and benzidine, benzidine being any indicator that gives a blue color with cerous salts to which ceric salts are reduced by peroxide.

(3) Leucomalachite with no outside indicator; leucomalachite is practically colorless and its oxidation product is the colored malachite green.

(4) Leucomethylene blue, which is oxidized by peroxide to the dye methylene blue.

These materials illustrate the class of satisfactory peroxide-colorable materials. They are known to be substantially non-volatile.

The protecting cover 12 is one of the commercial air impermeable and moisture impermeable materials of which plastics having these impermeabilities are particularly desirable. Such plastics are practically non-breakable and available in very thin, light sheets. Examples of covering materials that meet these requirements and that are satisfactory for the present envelopes are films or sheets of the following plastics: polyvinyl chloride, polyvinyl chloride and acetate copolymer, polyethylene, and chlorinated rubber, all in transparent condition.

The color comparison chart may be and suitably is printed directly upon the mounting sheet 24.

The sheath to reduce the effect of atomic fission radiation on the colorable composition is one of the base metals known to restrict the passage of the radiation. An example is lead foil sealed at one end and at the sides as shown in Fig. 2. To observe the colorable composition, the sensitive member 10 or 11 is lifted from the sheath.

In making the article of the invention, the hydrogen-peroxide-colorable composition and the necessary indicator, if any, are applied to the adsorbent base material, the composition being in the hydrogen-peroxide-reactive condition, such as ferrous, ceric, or leuco state (of the dye). The application is made, when necessary to protect this reactive state, in a non-oxidizing atmosphere as, for instance, in a chamber filled with nitrogen. The moisture to be supplied to the sheet 1 is suitably applied at the same time and under the same conditions. In fact, I find it convenient to dissolve the colorable compound, to form a dilute solution of the composition in the water, and then spray on the solution so made in such proportion that the amount of water applied to the adsorbent material is at least approximately equal to that in equilibrium with the said material at a temperature of 20° C. and a relative humidity of 70% and in all cases less than that which gives a liquid phase at the end of the application. Thus, I may apply water in amount to give approximately but not more than the equilibrium proportion adsorbed by the adsorbent material at 100% R. H. and 120° F.

When water, in the range of proportions stated, is sealed within the container or wrapper 2, no liquid water appears at any time during use or storage of the dosimeter at temperatures up to the highest normally encountered in summer weather. No bottle or other glass container is necessary for the composition.

The proportion of the colorable compound is low. Thus, I find that the proportion of any one of the three oxidizable or reducible (ceric) compounds given above may be only a trace proportion and yet develop the color in contact with the necessary indicators, if any. Examples of proportions of the coloring compositions that may be used are 0.05 to 0.5 part for 100 parts by weight of the adsorbent base material 10.

The adsorbent base may be protected against bacteria and molds. Thus, the whole assembly after sealing against access of air may be subjected to heat at a temperature below destruction of the organic material of the adsorbent base or of the peroxide-colorable composition adsorbed therein, as, for example, to temperatures between 110° and 120° C.

Also a bacteria and mold proofing agent may be introduced into the adsorbent base. Examples of such proofing agent are ethylene oxide, phenol, or sodium salicylate.

The invention will be further illustrated by description in connection with the following specific examples of the practice of it.

*Example 1*

A good grade of white blotting paper is sprayed lightly on one face with a 10% solution by weight of ferrous sulfate and potassium thiocyanate in water, the sulfate and thiocyanate being used in the proportion of about 1 part by weight of the former to 2 parts of the latter and in total amount to correspond to about 0.2% of the weight of the blotting paper. The blotting paper serving as the adsorbent base and the peroxide-colorable composition thereon are then dried to approximately constant weight at a temperature of 20° C. in air of relative humidity of 70%. The adsorbent so made is then cut into small units (10) each about 1 x 2 inches. These are mounted with the sprayed face out, on a card or mounting sheet (24) of size suitably 2 x 3.5 inches, the mounting being by means of a transparent plastic sheeting, in this case commercial plasticized polyvinyl chloride sheeting. This sheeting extends beyond the edges of the adsorbent base and is cemented to the card by means of a cement containing polyvinyl chloride resin dissolved in a volatile solvent therefor.

The assembly so made is then inserted into a sheath 22, the sheath being preformed from thin lead foil with the edges thereof united together by any usual means.

*Example 2*

The procedure of Example 1 is followed except that there is substituted for the peroxide-colorable composition of Example 1 any of the other peroxide-colorable combinations described earlier herein.

*Example 3*

The procedure of Example 1 or 2 is followed except that there is substituted for the blotting paper as the adsorbent base any of the other adsorbent materials disclosed herein for the same purpose, adsorbent powdered in a layer 11 within the container formed by parts 12 and 24, 12 being transparent.

The dosimeter made as described is simple, non-spilling, economical in construction, and so thin that it may be carried in the wallet or the pocket of a garment. It is convenient for observation and interpretation by simply withdrawing the "directions" card 24 and indicator mounted thereon from the metal sheath, noting the color of the indicator in ordinary light, and comparing the color with the comparison chart; the colors shown at 14, 16, 18 and 20 of the comparison chart show the colors for various levels of exposure to gamma rays for the particular colorable composition selected for use in the dosimeter. The sheet 22 filters out all but a fraction of the gamma rays incident thereon and thus protects the peroxide-colorable composition from over-exposure by the rays.

It will be understood that it is intended to cover all changes and modifications of the examples of the invention herein chosen for the purpose of illustration which do not constitute departures from the spirit and scope of the invention.

What I claim is:

1. A radiation dosimeter for measuring exposure to gamma rays, the dosimeter comprising a base material that is adsorptive of moisture and chemically inert under the conditions of use, a substantially non-volatile hydrogen-peroxide-colorable composition introduced in limited proportion into the exposed face of the base material, moisture adsorbed upon the base material in proportion less than that giving a liquid phase but at least equal to the proportion of water in equilibrium with the adsorbent base material at 20° C. and 70% relative humidity, and water and oxygen impermeable sealing material extending over the said face.

2. A radiation dosimeter for measuring the intensity of exposure to gamma rays which comprises a mounting sheet, a base material that is adsorptive of moisture and chemically inert under the conditions of use, a substantially non-volatile hydrogen-peroxide-colorable composition introduced in limited proportion into the exposed face of the base material, moisture adsorbed upon the base material in proportion less than that giving a liquid phase but at least equal to the proportion of water in equilibrium with the adsorbent base material at 20° C. and 70% relative humidity, water and oxygen impermeable sealing material extending over the said face, and means securing the adsorbent base material to the mounting sheet.

3. A radiation testing device comprising a metal sheath provided with a space to receive the dosimeter of claim 2, the metal of the sheet being one that transmits only a fraction of gamma rays incident thereon and thus protects the hydrogen-peroxide-colorable composition from over-exposure.

4. The radiation dosimeter of claim 1, the said hydrogen-peroxide-colorable composition being selected from the group consisting of a soluble ferrous salt mixed with an indicator showing change of color in contact with ferric iron, a ceric salt mixed with benzidine, leucomalachite, and leucomethylene blue.

References Cited in the file of this patent

UNITED STATES PATENTS

| | | |
|---|---|---|
| 2,258,593 | Black | Oct. 14, 1941 |
| 2,483,991 | Wollan et al. | Oct. 4, 1949 |
| 2,624,011 | Stern | Dec. 30, 1952 |
| 2,700,736 | Roberts | Jan. 25, 1955 |

FOREIGN PATENTS

| | | |
|---|---|---|
| 17,666 | Great Britain | Sept. 24, 1903 |